June 13, 1967  C. I. BOHLEN  3,324,596
ROLL-TYPE SIDE DOOR FOR TRAILER
Filed Aug. 18, 1964  2 Sheets-Sheet 1
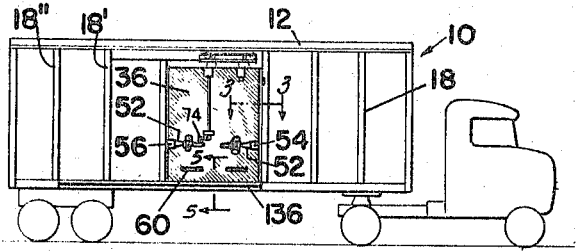
Fig. 1
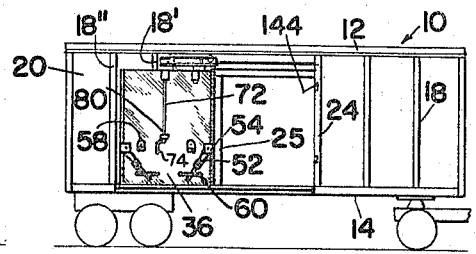
Fig. 2
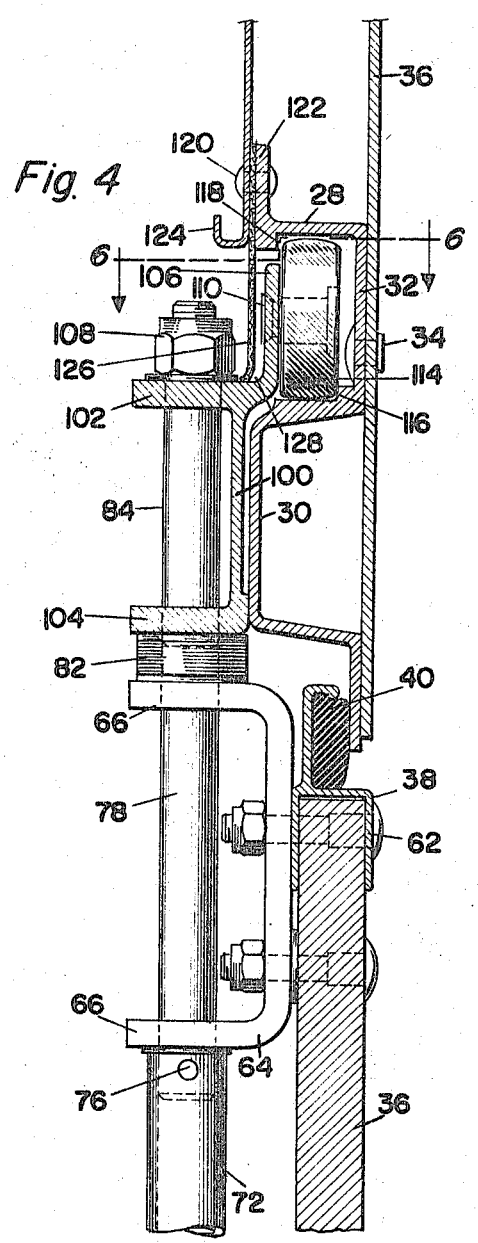
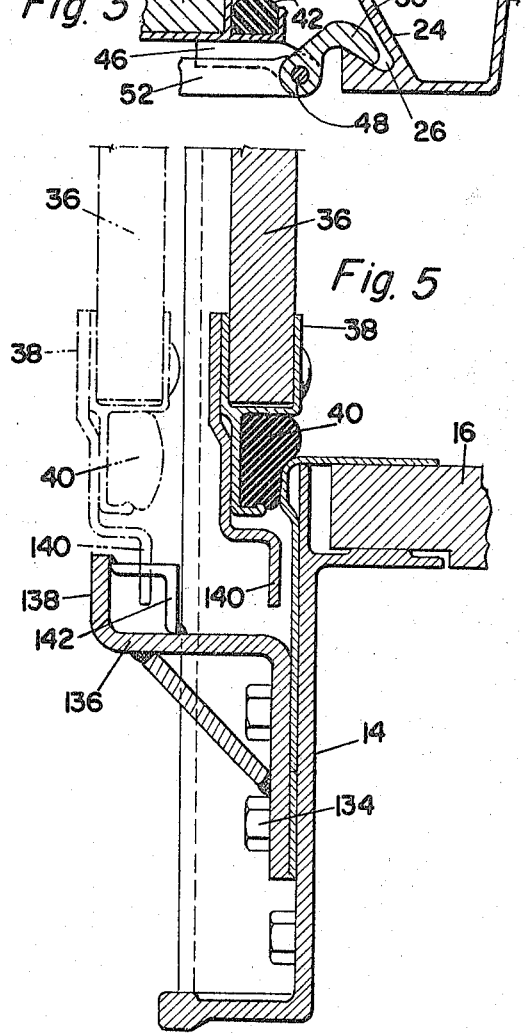
INVENTOR.
CHARLES I. BOHLEN
BY
Millman and Jacobs
ATTORNEYS

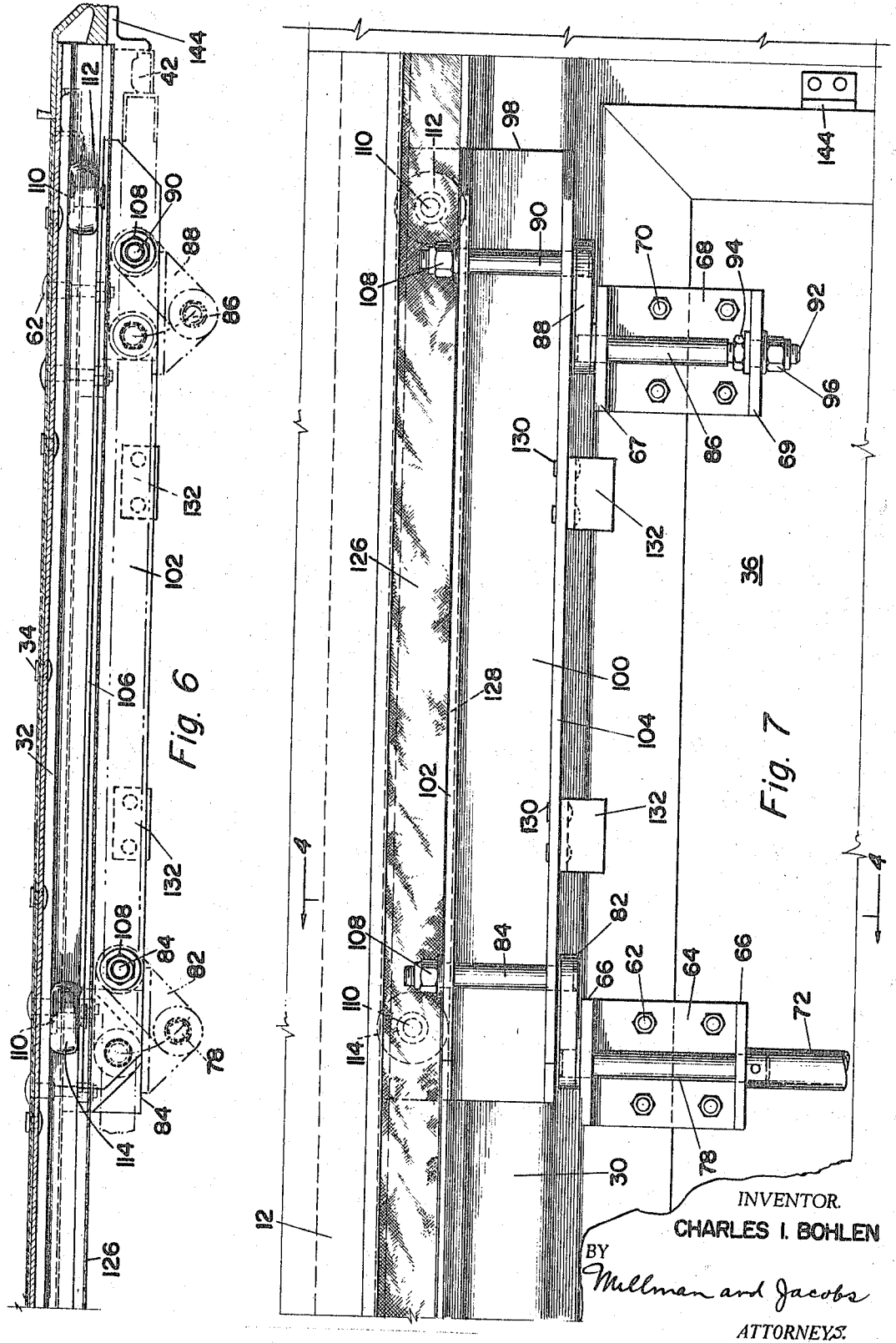

3,324,596
ROLL-TYPE SIDE DOOR FOR TRAILER
Charles I. Bohlen, Doylestown, Pa., assignor to Strick Corporation, Fairless Hills, Pa., a corporation of Pennsylvania
Filed Aug. 18, 1964, Ser. No. 390,338
9 Claims. (Cl. 49—218)

This invention relates to a door mounted to roll externally of the side wall of a vehicle, such as a trailer.

One type of semi-trailer in widespread use is constructed of support posts which extend vertically between upper and lower rails and side panels which are secured to and extend between the posts to form the trailer side walls. The posts are spaced apart a predetermined distance and when one of them is removed, a space between the remaining posts on both sides thereof is provided defining a door opening. It is the primary object of the invention to provide a door construction in which the door is mounted to roll from a position to close off the door opening, either flush with or recessed into the plane of the side wall, to one in which the door externally overlies the side wall beyond the door opening.

An important object of the invention is to provide a roll-type side door of the character described in which the door is suspended at its upper end by rollers engaged in a track extending horizontally above the doorway, the length of the track and the position of the rollers being such that the door can roll to a fully open position yet the track does not cut into or undermine a vertical support post immediately beyond the door opening.

Another object of the invention is to provide a roll-type door of the character described in which the horizontal track above the doorway receiving the rollers is a side opening channel which is recessed inwardly of the plane of the vertical support posts, there being a flexible shield covering the channel to prevent snow and dirt from entering, thus permitting smooth unobstructed movement of the rollers in the channel at all times.

Another object of the invention is to provide a roll-type side door for a vehicle in which the door is urged into or out of the plane of the door opening by a simple crank action, there being a means to limit the outward movement of the door and a means to adjust the position of the door relative to the door opening.

Another object of the invention is to provide a roll-type side door for a vehicle which is slidably mounted on the vehicle only at its upper end, thus effecting economy of manufacture and assembly without sacrificing function. A means may be employed to limit outward movement of the bottom of the door.

Yet another object of the invention is to provide a roll-type side door for a vehicle which is relatively simple in construction and operation and economical to assemble and repair.

These and other objects of the invention will become more apparent as the following description proceeds in conjunction with the accompanying drawings wherein:

FIG. 1 is a side elevational view of a trailer body embodying the door of the instant invention shown in the closed position;

FIG. 2 is a view similar to FIG. 1 showing the door in the open position;

FIG. 3 is a sectional view taken on the line 3—3 of FIG. 1;

FIG. 4 is a sectional view taken on the line 4—4 of FIG. 7;

FIG. 5 is an enlarged sectional view taken on the line 5—5 of FIG. 1;

FIG. 6 is a sectional view taken on the line 6—6 of FIG. 4; and

FIG. 7 is an enlarged fragmentary side elevational view of the upper end of the door.

Specific reference is now made to drawings in which similar reference characters are used for corresponding elements throughout.

Indicated at 10 is a conventional semi-trailer whose body is constructed, among other things, of longitudinal upper or roof rails 12, longitudinal lower rails 14 supporting floor boards 16, vertical support posts 18 secured between the upper and lower rails and side panels or sheets 20 secured to and between the posts. Generally, the posts are each about 5" wide and are spaced about 24" apart. The removal of one of the posts and the side panels secured thereto therefore provides a doorway 22 which is about 43" wide. Two vertical posts 24 and 25 serve as vertical jambs or framing members. They are the same as the other posts, which are generally hat-shaped in cross-section, except that they are also provided with vertically extending recesses 26 which open towards and along the side of the trailer, as seen in FIG. 3, for a purpose later to appear.

It will be seen that the forward door frame post 24 extends up to the top rail 12, but the rear door frame post 25 is shorter. Forming the upper horizontal frame member or jamb is a member 28 which extends horizontally from the front door frame post 24 across the door opening 22, across the rear door frame post 25 and up to the next rear post 18. Thus, the member 28 is about 1½ times the width of the door opening and consists of a lower horizontal portion 30 of hat-shaped cross-section whose depth is that of the vertical posts 18, and an upper channel portion 32 which opens outwardly along the side of vehicle above the door opening. The member 28 is secured by rivets 34 to a section of paneling or sheet 36 which is secured to and depends from the top rail 12. The depth of the channel 32, which serves as a trackway, is no greater than the depth of the lower portion 30 and hence is recessed, so to speak, inwardly beyond the plane of the outer face of the member 30 and that of the vertical posts 18.

The door 36 is preferably a metallic substantially rectangular plate to whose top and bottom vertical edges are secured channel frames 38 that carry rubber sealing strips 40 adapted to engage and be compressed by the flange of the lower member 30 of the channel member 28, see FIG. 4, and by an edge of the lower rail 14, see FIG. 5, when the door is in its locked position in the door opening. Compressible rubber sealing strips are also provided along the inside of the door adjacent its vertical edges as at 42 for engagement with a vertical flange 44 of the front and rear door frame posts 24 and 25.

The door locks comprise vertically spaced straps 46 secured to the door adjacent each vertical edge thereof, a vertical rod 48 extending through said straps for movement around a vertical axis, an arcuate or angulated lip 50 extending laterally from the rod, beyond and substantially coextensive with the vertical edge of the door and a handle 52 to operate the rod, the handle being pivoted around a horizontal axis as at 54 to a lug 56 which is secured to and extends laterally from the rod in a direction opposite to the lip 50. Thus, when the handle is pivoted to the up position substantially perpendicular to the rod 48 and rotated away from the door, the lip 50 can be inserted in the recess 26 of the corresponding door frame post 24 or 25. Rotation of the handle towards the door will draw the door into the door opening and compress the rubber sealing strips 40 and 42. Each handle 52 has a slot to be received in a keeper 58 on the door to hold the latter in a locked position. A pair of horizontally extending bails or U-handles 60 are affixed to the door adjacent its lower edge which are accessible from ground level and by which the door can be rolled, the bails 60 serving also to receive and retain the lock handles 52 when the latter are pivoted downwardly in the open position, as seen in FIG. 2.

Bolted as at 62 to the upper end of the door and substantially centrally thereof is a U-bracket 64 having vertically spaced flanges 66. A similar U-bracket 68 having upper and lower flanges 67 and 69 is bolted as at 70 to the upper end of the door adjacent its front edge. A vertically extending tubular member 72 is provided whose lower end is formed with a crank handle 74 and whose upper end is keyed as at 76 to a rod 78 of narrower diameter which extends for rotation about a vertical axis through the flanges 66. Adjacent the handle 74, the door has a clip or bearing 80 which journals the tubular member 72. Secured upon the upper end of rod 78 beyond the flange 66 is a radially extending link 82 to the end of which is secured a vertically extending rod or pintle 84.

Extending for rotation about a vertical axis through the upper and lower flanges 67 and 69 of the bracket 68 is a short rod 86 whose upper end is secured to a radially extending link 88 to the end of which is secured a vertically extending rod or pintle 90. The lower end of the rod 86 is threaded as at 92 and mounts a washer and nut 94 on one side of the lower flange 69 and another washer and nut 96 on the other side of the flange so that the position of the door can be adjusted and trued up relative to the door opening 22. The axes of the tubular member 72 and rods 84, 86 and 90 are substantially parallel to each other and the longitudinal axes of the links are also substantially parallel to each other at all times.

A carriage 98 is provided of length approximating half the width of the door, consisting of a plate formed of a member which is substantially U-shaped in cross-section having a web portion 100 adjacent and in front of the hat-section portion 30 of the member 28 and horizontally extending upper and lower flanges 102 and 104 joining the ends of the web portion. At its upper end the web portion continues beyond the upper flange 102 and forms a bar 106 which dips into the channel 32 of the member 28. The rods 84 and 90 extend through the upper and lower flanges 102 and 104 of the carriage for rotation about vertical axes and are there secured by appropriate nuts 108.

Secured for rotation about horizontal axes to the carriage bar 106 as at 110 adjacent each rod 84 and 90 is a pair of vertical front and rear rollers 112 and 114, the latter being received in the channel track 32. It will be seen that the channel track 32 is formed with an upstanding shoulder 116 in its lower surface to limit inward movement of the rollers and a depending lip 118 at its upper open end to limit outward movement of the rollers.

Secured by rivets as at 120 to the upper flange 122 above the shoulder 118 of the member 28 is a horizontally extending rain gutter 124 which is in turn secured at its upper end to the roof or top rail 12. Secured to the flange 22 by the same rivets 120 and extending beneath the gutter in front of the carriage bar 106 and for the full length of the member 28 is a flexible shield 126 made of canvas or plastic. The lower edge 128 of the shield rests upon the upper flange 102 of the carriage and prevents snow and dirt from entering the channel 32.

Secured as at 130 to the lower flange 104 of the carriage is a pair of L-shaped brackets each having a vertically extending flange 132 for a purpose soon to appear.

Bolted or otherwise secured to the lower rail 14 as at 134 is a further rail member 136 which extends from the front door frame post 24 to that vertical post which is twice the distance of the door opening from said front door frame post 24. The rail member 136 is substantially Z-shaped in cross-section and therefore includes an upstanding flange 138 which is spaced outwardly from the lower rail 14 a predetermined distance. The frame 38 along the lower horizontal edge of the door includes a depending bar 140 which extends into the space between the flange 138 and the lower rail 14. A stop 142 in the form of an angle iron is secured to the rail member 136 inwardly of the flange 138 at the extreme rear end of the rail member and further stops in the form of angle brackets are secured to the front door frame post 24 including flanges 144 which extend outwardly of the plane of the vehicle side wall.

In use, to open the door, the handles are released from the keepers 58 and are rotated outwardly away from the door until the lips 50 are disengaged from the recesses 26 in the front and rear door frame posts 24 and 25. The handles 52 are then pivoted downwardly and retained behind the bails 60, as seen in FIG. 2. The crank handle 74 is then rotated to the right which causes the links 82 and 88 to assume the dotted line positions shown in FIG. 6. This pulls the door out of the door opening 22 and places it in position to roll externally of the side wall of the vehicle. The engagement of the upper edge of the door with the vertical flanges 132 limits its outward movement otherwise the handle could be rotated beyond 90° and cause the door to retract towards the door opening. The flange 138 of the lower rail member 136 can engage the bar 140 at the lower edge of the door to limit its outward movement thereat.

The door is then pulled rearwardly with the aid of the bails or handles 60 in which action the rollers 112 and 114 ride freely in the channel track 32 and during the full length of travel the flexible shield 126 covers the channel track 32. When the door is fully opened, the rear edge of the corner bar 140 strikes an edge of the angle stop 142. Note, as shown in FIG. 2, that in the fully open position, front roller 114 is adjacent the post 18' immediately to the rear of the rear door frame post 25 and the rear vertical edge of the door is adjacent the post 18" immediately to the rear of post 18'. Thus, the door can open fully although the channel member 28 extends only from post 24 to post 18', a distance equivalent to one and one-half times the width of the door opening 22. To close the door, the same is rolled forwardly until its front vertical edge engages the stops 144 at which time the door is directly in front of the doorway. The locking handles are then raised and rotated so that the lips 50 are directed inwardly towards the recesses 26 of the posts 24 and 25. The crank handle 74 is then rotated towards the door which moves the door into the doorway and further rotation of the locking handles 52 towards the door and their engagement with the keepers 58 will complete the locking action.

While a preferred embodiment of the invention has here been shown and described, a skilled artisan may make minor variations without departing from the spirit of the invention and the scope of the appended claims.

I claim:

1. In a vehicle having a side wall and a substantially rectangular opening therein defining a doorway, a door substantially coextensive with said doorway, a channel trackway extending longitudinally above and beyond said doorway and opening outwardly of said side wall, a longitudinal carriage, rollers mounted on said carriage and extending into said channel trackway, crank means mounting said door on said carriage for selective movement laterally into and out of said doorway, a handle mounted for rotation about a vertical axis on said door and operatively connected to said crank means, and stop means mounted on said carriage and engageable with the upper edge of said door to limit outward lateral movement of said door.

2. In a vehicle having a side wall and a substantially rectangular opening therein defining a doorway, a door substantially coextensive with said doorway, a channel trackway extending longitudinally above and beyond said doorway and opening outwardly of said side wall, a longitudinal carriage, rollers mounted on said carriage and extending into said channel trackway, crank means mounting said door on said carriage for selective movement laterally into and out of said doorway, a handle mounted for rotation about a vertical axis on said door and operatively connected to said crank means, stop means mounted on said carriage and engageable with the upper edge of said door to limit outward lateral movement of said door, and means interengageable between the lower edge of said door and the side wall beneath said doorway to limit outward lateral movement of the lower edge of said door.

3. The combination of claim 2 wherein said last-named means includes a rail secured to said side wall beneath said doorway and including a longitudinal portion spaced from said side wall, and a member depending from the lower edge of said door and extending into the space between said longitudinal portion of said rail and said side wall.

4. In a vehicle having a side wall and a substantially rectangular opening therein defining a doorway, a door substantially coextensvie with said doorway, a channel trackway extending longitudinally above and beyond one vertical side edge of said doorway and opening outwardly of said side wall, a longitudinal carriage, spaced rollers mounted on said carriage and extending into said channel trackway, one of said rollers being positioned substantially centrally of the door and the other roller being positioned toward the trailing edge of the door as it moves to the open position and crank means mounting said door on said carriage for selective movement laterally into and out of said doorway, said channel trackway being substantially one and one-half times as long as the width of said doorway whereby said door completely uncovers said doorway when said centrally disposed roller reaches the remote end of said trackway, as to permit their unobstructed movement in said trackway up to at least the center of said door, and a rail secured to said side wall beneath said doorway and including a longitudinal portion spaced from said side wall, a member depending from the lower edge of said door and extending into the space between said longitudinal portion of said rail and said side wall and a stop in said space adapted to engage said depending member when said door is in its fully open position.

5. In a vehicle having side walls constructed of longitudinally spaced vertical posts and sheets secured therebetween, the posts including outer facing spaced a predetermined distance from said sheets, said sheets being discontinued between a pair of posts to define a doorway therebetween, a door substantially coextensive with said doorway, a channel trackway extending longitudinally above and beyond said doorway and opening outwardly of said side wall, said trackway being recessed into the confines of said space between the outer faces of said posts and said sheets, a longitudinal carriage, rollers mounted on said carriage and extending into said channel trackway, crank means mounting said door on said carriage for selective movement laterally into and out of said doorway, a handle mounted for rotation about a vertical axis on said door and operatively connected to said crank means, and stop means mounted on said carriage and engageable with the upper edge of said door to limit outward lateral movement of said door.

6. The combination of claim 5 wherein said carriage includes a portion offset to extend into said trackway through its opening, said rollers being carried by said offset portion, and a flexible shield covering said trackway opening and said offset portion of said carriage.

7. The combination of claim 5 and means interengageable between the lower edge of said door and the side wall beneath said doorway to limit outward lateral movement of the lower edge of said door.

8. In a vehicle having side walls constructed of longitudinally spaced vertical posts and sheets secured therebetween, the posts including outer faces spaced a predetermined distance from said sheets, said sheets being discontinued between a pair of posts to define a doorway therebetween, a door substantially coextensive with said doorway, a channel trackway extending longitudinally above and beyond said doorway and opening outwardly of said side wall, said trackway being recessed into the confines of said space between the outer faces of said posts and said sheets, a longitudinal carriage, rollers mounted on said carriage and extending into said channel trackway, crank means mounting said door on said carriage for selective movement laterally into and out of said doorway, and means to lock said door in said doorway along both of its vertical side edges, said means including a laterally extending vertical recess in each post at the vertical side edges of said doorway substantially as long as the height of said door, a rod pivoted about a vertical axis on said door and including a latching lip extending laterally from said rod and substantially as long as the height of said door, a handle extending laterally from said rod in a direction opposite to said lip and a keeper on said door whereby upon rotation of said handle, said lip can engage in said recess and be locked therein when said handle is retained by said keeper.

9. In a vehicle having side walls constructed of longitudinally spaced vertical posts and sheets secured therebetween, the posts including outer faces spaced a predetermined distance from said sheets, said sheets being discontinued between a pair of posts to define a doorway therebetween, a door substantially coextensive with said doorway, a channel trackway extending longitudinally above and beyond said doorway and opening outwardly of said side wall, said trackway being recessed into the confines of said space between the outer faces of said posts and said sheets, a longitudinal carriage, spaced rollers mounted on said carriage and extending into said channel trackway, one of said rollers being positioned substantially centrally of the door and the other roller being positioned toward the trailing edge of the door as it moves to the open position and crank means mounting said door on said carriage for selective movement laterally into and out of said doorway wherein said channel trackway is substantially one and one-half times as long as the width of said doorway whereby said door completely uncovers said doorway when said centrally disposed roller reaches the remote end of said trackway.

References Cited
UNITED STATES PATENTS

| | | | |
|---|---|---|---|
| 1,300,475 | 4/1919 | O'Connor | 20—23 |
| 2,741,807 | 4/1956 | Powers | 20—23 |
| 2,876,504 | 3/1959 | Bennett et al. | 20—33 |
| 2,997,752 | 8/1961 | Henrikson et al. | 20—23 |

DAVID J. WILLIAMOWSKY, *Primary Examiner.*

HARRISON R. MOSELEY, *Examiner.*

A. I. BREIER, *Assistant Examiner.*